Figure 1:
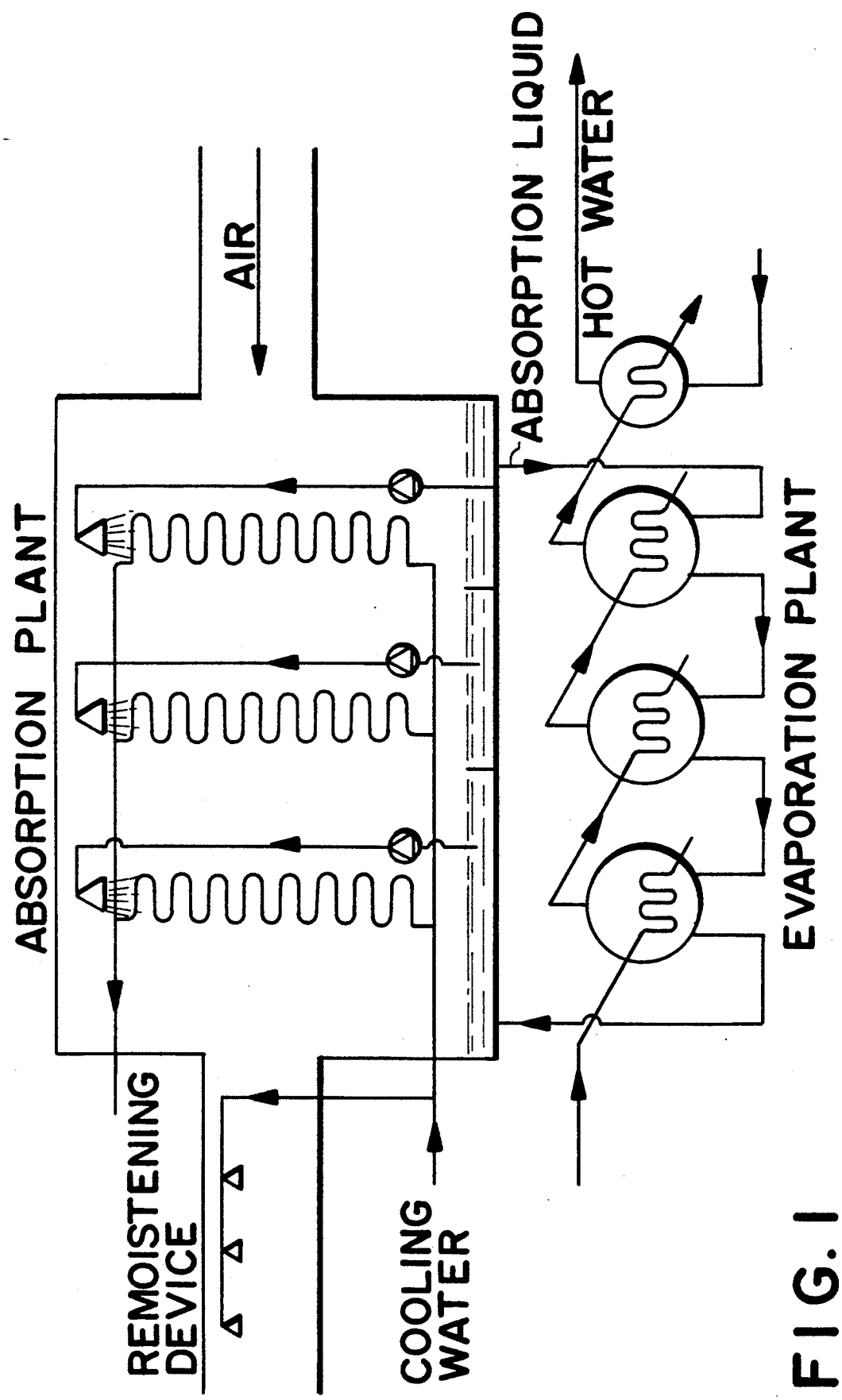

United States Patent [19]

Hellman

[11] Patent Number: 5,024,062
[45] Date of Patent: Jun. 18, 1991

[54] MULTISTAGE ISOTHERMAL AIR DEHUMIDIFICATION

[76] Inventor: Lars G. Hellman, Norrtullsgatan 10, S-113 27 Stockholm, Sweden

[21] Appl. No.: 488,019
[22] PCT Filed: Oct. 21, 1988
[86] PCT No.: PCT/SE88/00555
§ 371 Date: May 16, 1990
§ 102(e) Date: May 16, 1990
[87] PCT Pub. No.: WO89/04713
PCT Pub. Date: Jun. 1, 1989

[30] Foreign Application Priority Data

Nov. 20, 1987 [SE] Sweden .................. 8704598

[51] Int. Cl.⁵ .................................. F25D 17/06
[52] U.S. Cl. .................................. 62/92; 62/94; 62/272
[58] Field of Search .................. 62/92, 94, 271, 93

[56] References Cited

U.S. PATENT DOCUMENTS

| | | | |
|---|---|---|---|
| 2,017,027 | 10/1935 | Forrest | 62/94 |
| 2,182,453 | 12/1939 | Sellew | 62/271 |
| 2,894,376 | 7/1959 | Kelley | 62/94 |

FOREIGN PATENT DOCUMENTS

| | | |
|---|---|---|
| 8904713 | 6/1989 | PCT Int'l Appl. . |
| 313283 | 8/1969 | Sweden . |
| 432531 | 4/1984 | Sweden . |
| 224921 | 2/1989 | Sweden . |
| 563379 | 8/1944 | United Kingdom . |
| 747480 | 4/1956 | United Kingdom . |
| 1391632 | 4/1975 | United Kingdom . |
| 1596568 | 8/1981 | United Kingdom . |

Primary Examiner—Albert J. Makay
Assistant Examiner—John Sollecito
Attorney, Agent, or Firm—Mary Helen Sears; Stephen Glazier

[57] ABSTRACT

A process for conditioning a gas containing the vapors of a volatile substance, in which the gas is placed sequentially in contact with successively more concentrated solutions of an absorption liquid on cooled surfaces, such absorption liquid consisting of a solution of said volatile substance and at least one non-volatile substance. The vapors in the gas are isothermally absorbed into the absorption liquid upon such contact, thereby diluting the concentration of the absorption liquid. The diluted absorption liquid is concentrated by multi-stage evaporation in a multi-stage evaporator. The concentrated absorption liquid is recycled back to the cooled surfaces.

4 Claims, 2 Drawing Sheets

MULTISTAGE ISOTHERMAL AIR DEHUMIDIFICATION

The present invention relates to a process for gas conditioning, especially air conditioning, according to a novel principle comprising isothermal step-by-step dehumidification of the gas by means of a suitable liquid, over which the vapour pressure of the substance absorbed is low, and multi-stage evaporation of said liquid before re-use.

In certain areas of the earth the climate is characterized by a high air temperature throughout the year or during parts thereof. This high air temperature is often combined with a high relative humidity. When the temperature approaches the human body temperature the conditions are oppressive and strenuous. Various methods for lowering the temperature by more or less sophisticated technics have been practiced during the years.

In industrialized countries various methods for cooling, dehumidification, reheating and remoistening have been practiced for a long time. A good energy supply is required for all these measures. All kinds of energy are not equivalent in that connection. The most frequent air conditioning technics comprises cooling by means of mechanical vapour compression of a cooling medium, in most cases under electricity consumption.

In an attempt to replace the electricity by thermal energy the absorption technics for dehumidification and cooling has been utilized. However, the efficiency of said processes has not been as good as that obtained with mechanical compression. On the other hand the costs of electric energy is considerably higher than the costs of thermal energy.

The traditional absorption heat pump known for a long time operates with one absorption stage and one stage for regenerating the absorption liquid. When the energy used in the latter stage can be utilized the energy recovered would theoretically be twice the energy supplied. In reality the heat factors are 1.1-1.5.

One of the obstacles for improving the heat factor of the traditional absorption heat pump is the great boiling point elevations always occurring in absorption liquids consisting of aqueous solutions of very soluble salts. The inclination to absorb water from a gas is combined with a corresponding disinclination to release this water by boiling.

In order to cool air having a high temperature and a high humidity the air may be contacted with a suitable moisture absorbing liquid under simultaneous cooling which results in a removal of the heat of evaporation of the water condensed, which heat is released during the absorption. It is desirable that the absorption be carried out by means of a salt solution as concentrated as possible in order to obtain a treated air having a relative humidity as low as possible. Since the untreated air in most cases has a high temperature and a high relative humidity and the available cooling water temperature often is close to the air temperature, the absorption may be said to take place as good as isothermally. It is necessary to avoid a greater dilution of the absorption liquid since the low relative humidity will then be jeopardized. In practice this means a boiling point elevation of 70°-80° C. during the regeneration of the liquid which makes it difficult or impossible to save energy by means of e.g. multi-stage evaporation, compressor evaporation, etc.

According to the invention these difficulties are eliminated by carrying out the absorption of the moisture of the air or gas in several successive absorption stages, the water absorption from the air having the highest humidity being carried out with an absorption liquid having a low concentration and the concentration of the absorption liquid being increased successively from stage to stage. Consequently, the consumption of thermal energy when regenerating the absorption liquid may be decreased by the isothermal multi-stage absorption in the air conditioning process according to the invention.

Thus, the present invention relates to a process for conditioning moist gas, which process is characterized in that the gas step-by-step is contacted with a successively more concentrated absorption liquid consisting of a solution of one or more non-volatile components in the substance condensing during the absorption, which is carried out isothermally or almost isothermally on cooled surfaces, and that the diluted absorption liquid is concentrated by evaporation and recycled to the absorption device.

According to one embodiment of the invention the absorption is carried out step-by-step counter-currently, and the diluted absorption liquid is concentrated by multi-stage evaporation. According to another embodiment the diluted absorption liquid obtained in each absorption stage is concentrated in a corresponding stage of a multi-stage evaporator having as many stages as the absorption device.

Preferably, the process according to the invention is applied to air conditioning in which case the absorption liquid is an aqueous solution of one or more salts, and the resulting air having a low humidity is re-moistened to the desired humidity by the injection of water, whereby the air simultaneously is cooled to the desired temperature by the evaporation of water.

Accordingly, the invention makes it possible to carry out air conditioning by means of thermal energy, the specific energy consumption being substantially lower than in prior art processes. It is possible to halve the previous usual energy consumption for absorption heat pumps.

The absorption liquid may consist of one or more non-volatile compounds dissolved in the component removed from the gas during the absorption. The solubility of the non-volatile components must be considerable in order to bring about a substantial reduction of the vapour pressure of the volatile component above the solution. The choice of non-volatile component will of course be different if the substance to be absorbed is water vapour or if it is another substance, e.g. alcohol vapour. When the absorption liquid is an aqueous solution useful non-volatile components are e.g. potassium acetate, sodium acetate, potassium carbonate, calcium chloride, lithium chloride and lithium bromide. Particularly good results are obtained with a mixture of about 30% by weight of sodium acetate and about 70% by weight of potassium acetate.

Figure 2:
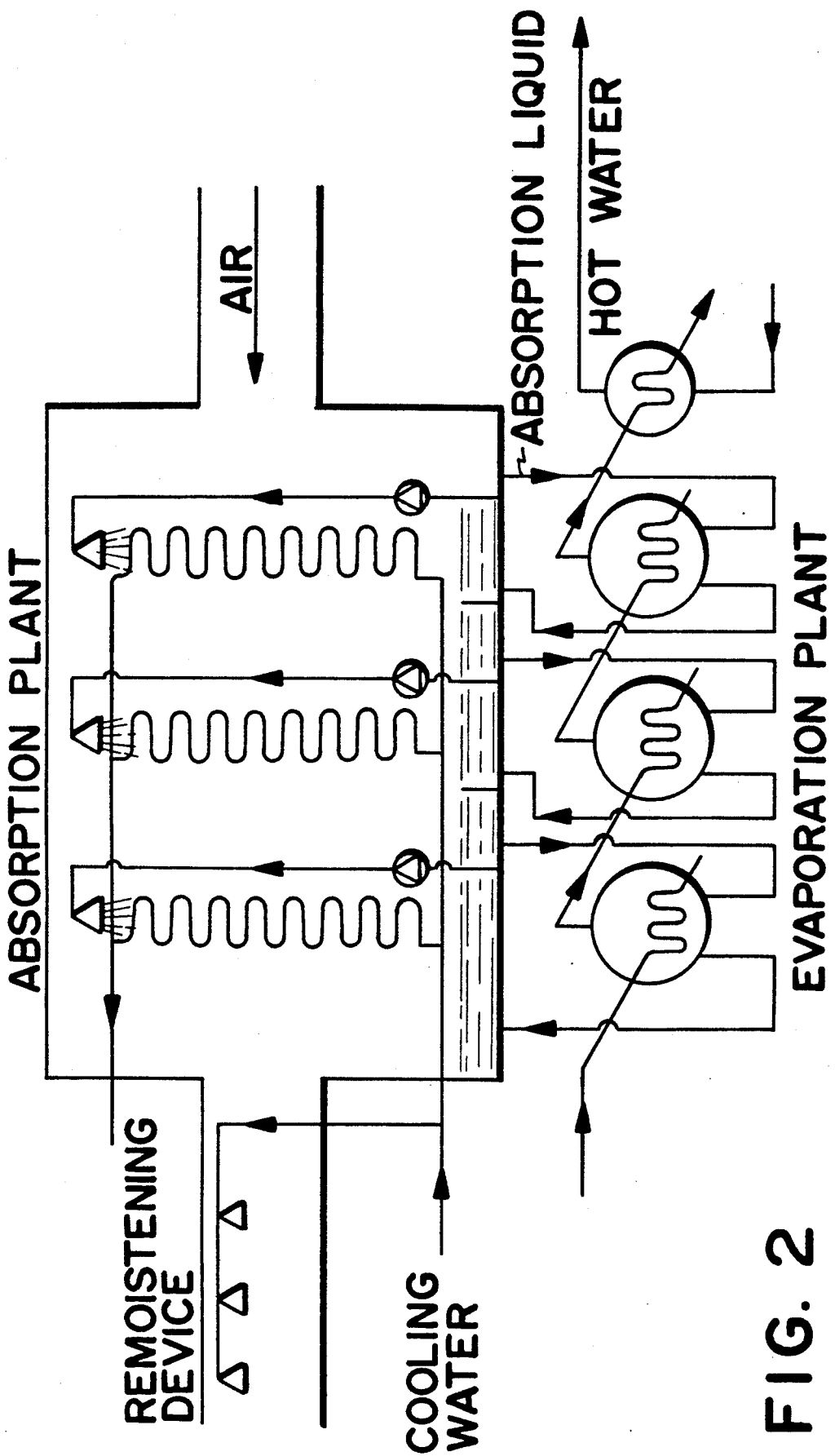

By way of example, the invention will be described further below with reference to the accompanying drawing, in which FIGS. 1 and 2 illustrate different embodiments of the process according to the invention.

In the embodiment shown in FIG. 1 hot and moist air is passed through a three-stage absorption plant counter-currently to an absorption liquid (salt solution). The absorption in each stage takes place on surfaces cooled by means of cooling water so that the heat of evaporation of the water condensed during the absorption is removed. Consequently, the concentration of the absorption liquid is at the highest level where the air is driest, and the absorption liquid will get a successively lower concentration by the step-wise contact with successively moister air. The diluted absorption liquid obtained in the first absorption stage is fed to a conventional three-stage evaporator, and the resulting concentrated absorption liquid is recycled to the absorption plant. The steam leaving the evaporation plant may be used for the preparation of hot water. The air dehumidified in the absorption plant is re-moistened by the injection of water whereby the air temperature simultaneously will be lowered. This process may be controlled in such a manner that a pleasant air having a temperature of e.g. 22°-24° C. and a relative humidity of e.g. 50-60% will be obtained.

Instead of using the waste heat from the last evaporation stage for the preparation of hot water said heat may be used for pre-heating air. The relative humidity of the heated air will be so low that the air will be capable of removing water even from the most concentrated salt solution by direct contact therewith (the air is bubbled through the solution). In this way the problems with the boiling point elevation of the absorption liquid will be further reduced.

By such a counter-current process the salt concentration of the liquid may be lowered by the dilution caused by the water vapour absorption. As a result of the counter-current process the boiling point elevation of the liquid to be regenerated will be so low that it will be possible to save energy by means of multi-stage evaporation. The deliberate measures taken to obtain an absorption liquid having a low boiling point elevation do not only enable regeneration by means of a traditional multi-stage evaporation in order to save energy but also enable other regeneration methods giving a similar energy saving.

When the salt solution is circulated in series through all the absorption stages and then is regenerated by being circulated in series through the evaporation stages the concentration of the diluted salt solution (and thereby the boiling point elevation) up-stream the evaporation plant is determined by adjusting the amount of circulating salt solution to the amount of water absorbed.

The embodiment shown in FIG. 2 differs from the embodiment according to FIG. 1 by the fact that three separate circuits of absorption liquid are used. In this embodiment isothermal step-by-step absorption of the humidity of the air is carried out as follows. The air of high relative humidity fed to the absorption plant is first treated with a diluted salt solution in the first stage, then with a stronger salt solution in the second stage, and finally with a still stronger salt solution in the third stage. The salt solution from each absorption stage is regenerated in a separate, corresponding evaporation stage and the salt solution concentrated by evaporation is recycled to the absorption stage in question. In each absorption liquid circuit the liquid to be regenerated may optionally be heat exchanged against the regenerated, concentrated liquid. In this embodiment, where each evaporation stage operates in series with an absorption stage at the liquid side, the evaporation stages at the steam side are arranged in the same manner as in conventional multistage evaporation. The amount of water evaporated in the evaporation stages is controlled by the energy amount supplied by unit of time to the first evaporation stage. If an average water amount of 500 kg/h is to be evaporated in each evaporation stage and this is not attained, the salt concentration in the circulation circuit having the highest salt concentration will be too low to assure the desired low relative humidity of the air. By increasing the input effect to the first stage of the evaporation plant, the proper conditions are restored. On the other hand, too high an input effect results in a too high boiling point elevation of the weakest absorption liquid in the absorption stage having the highest air humidity, and this will more or less destroy the possibilities of multi-stage evaporation.

An advantage of the embodiment shown in FIG. 2 is that air pollutants, if any, absorbed in the first absorption stage do not contaminate all the absorption liquid. Only the liquid in the "first" circuit has to be purified.

Of course the invention is not restricted to the use of three absorption stages and three evaporation stages but the number of stages may be chosen freely in each specific case depending upon the conditions prevailing and the result desired.

Nor is the invention restricted to those cases where air is treated by absorption in open systems but the invention may be applied also to closed systems with extern heat exchange, where the absorption takes place with a circulating gas mass or only with vapour from the volatile part of media couples suitable for absorption heat pump technics.

The invention is illustrated by the following example.

EXAMPLE

Air having a temperature of 35° C. and a relative humidity of 90% is treated in a plant such as that shown in FIG. 1. The amount of air is 100,000 kg/h. The absorption liquid is an aqueous solution of a salt mixture consisting of 30% by weight of sodium acetate and 70% by weight of potassium acetate. The cooling water temperature is 28° C. The concentrated salt solution from the evaporation plant (3,200 kg/h) has a salt concentration of about 72% by weight. In the absorption plant this salt solution is passed counter-currently to the air whereby it is diluted to a final concentration of about 40% by weight in the first absorption stage. The amount of water absorbed is 2,600 kg/ h, and substantially the same amounts of water are absorbed in each stage.

The diluted salt solution leaving the absorption plant is concentrated (regenerated) in the three-stage evaporator, the boiling points in the three stages being 205° C., 135° C. and 110° C., respectively. In this example the first evaporation stage is directly heated by means of natural gas. The steam leaving the last evaporation stage is passed to a heat exchanger wherein the heat is utilized for heating water to form hot water. The energy demand for the regeneration of the salt solution is about 700 Mcal/h.

The absorption in the absorption plant is almost isothermal and the air leaving the absorption plant has a temperature of 30° C. and a relative humidity of 25%. This air is re-moistened by the injection of water under adiabatic conditions, water being injected in an amount such that the resulting conditioned air has a temperature of 22° C. and a relative humidity of 60%.

I claim:

1. A process for conditioning a gas containing the vapors of a volatile substance, which comprises:
   placing a gas, containing the vapors of a volatile substance, sequentially in contact with successively more concentrated solutions of an absorption liquid on cooled surfaces, such absorption liquid consisting of a solution of said volatile substance and at least one non-volatile substance, isothermally absorbing the vapors in the gas into the absorption liquid upon such contact, thereby diluting the concentration of the absorption liquid, concentrating the diluted absorption liquid by multi-stage evaporation in a multi-stage evaporate, and recycling the concentrated absorption liquid back to the cooled surfaces.

2. The process of claim 1, further comprising:

flowing the absorption liquid in a direction over a series of the cooled surfaces, and flowing the gas, containing the vapors of a volatile substance, over the series of cooled surfaces in the direction opposite to the direction of flow of the absorption liquid.

3. The process of claim 1, further characterized by:

the use of the series of cooled surfaces arranged in a series of stages, the number of such stages corresponding to the number of stages in the multi-stage evaporator, and concentrating the diluted absorption liquid from each such stage of cooled surfaces in a corresponding stage of the multi-stage evaporator.

4. The process of claim 1 further characterized by:

the absorption liquid being an aqueous solution of one or more salts, the vapors in the gas being water vapor, the gas being air, and humidifying the air after the water vapor is absorbed from the air by spraying water into the air, causing the air to be cooled to the desired temperature by the evaporation of the sprayed water.

* * * * *